United States Patent [19]
Chaudhary et al.

[11] Patent Number: 5,962,545
[45] Date of Patent: Oct. 5, 1999

[54] METHOD OF ENHANCING OPEN CELL FORMATION IN ALKENYL AROMATIC POLYMER FOAMS

[75] Inventors: Bharat I. Chaudhary, Pearland, Tex.; Bruce A. Malone, Granville, Ohio

[73] Assignee: The Dow Chemical Company, Midland, Mich.

[21] Appl. No.: 08/880,954

[22] Filed: Jun. 23, 1997

[51] Int. Cl.[6] .................................................. C08J 9/12
[52] U.S. Cl. ........................ 521/146; 521/79; 521/81; 521/82
[58] Field of Search ................... 521/79, 81, 82, 521/146

[56] References Cited

U.S. PATENT DOCUMENTS

| | | |
|---|---|---|
| 5,109,029 | 4/1992 | Malone ........................................ 521/79 |
| 5,340,840 | 8/1994 | Park et al. . |
| 5,434,195 | 7/1995 | Imeokparia et al. . |
| 5,557,896 | 9/1996 | Imeokparia et al. . |

FOREIGN PATENT DOCUMENTS

| | | |
|---|---|---|
| 2129278 | 10/1996 | Canada . |
| 96/34038 | 2/1995 | WIPO . |

*Primary Examiner*—John M. Cooney, Jr.
*Attorney, Agent, or Firm*—John H. Roberts

[57] ABSTRACT

Disclosed is a method of enhancing open cell formation in making extruded alkenyl aromatic polymer foams of about 30 percent or more open cell content. Open cell formation is enhanced by incorporating into the foam an ethylene copolymer having a Vicat softening point of about 85° C. or less. The ethylene copolymer is incorporated at from about 0.1 to about 7 percent based upon the weight of the alkenyl aromatic polymer material comprising the foam.

16 Claims, No Drawings

METHOD OF ENHANCING OPEN CELL FORMATION IN ALKENYL AROMATIC POLYMER FOAMS

BACKGROUND OF THE INVENTION

The invention relates to a method of enhancing open cell formation in making extruded alkenyl aromatic polymer foams of about 30 percent or more open cell content.

Open cell alkenyl aromatic polymer foams are taught in the art as useful in a variety of end-use applications such as in insulation, roofing recovery, and absorbency. Such foams and applications for them are seen in U.S. Pat. Nos. 5,434,195 and 5,557,896 and Canadian Application 2,129,278.

A problem in making open cell alkenyl aromatic polymer foams is achieving consistent and elevated levels of open cell content while avoiding high foaming temperatures. High foaming temperatures can cause foam collapse resulting in high foam density and small cross-section.

One means employed in the art to more easily achieve elevated open cell content is to employ loadings (i.e. 3–10 weight percent based upon weight of the alkenyl aromatic polymer) of dissimilar, nonmiscible polymers in the alkenyl aromatic polymer material comprising the foam. The dissimilar, nonmiscible polymers help to open cells by forming domains in the walls of expanding cells. The domains increase the likelihood of pores developing in the walls of cells. In making open cell alkenyl aromatic polymer foams, conventional dissimilar, nonmiscible polymers employed have included polyethylenes such as low density polyethylenes, linear low density polyethylenes, and high density polyethylenes.

There are disadvantages to using the conventional dissimilar, nonmiscible polymers. First, the amounts typically required were relatively high (i.e. 3–10 weight percent). The excessive amounts have resulted in additional expense as well as negatively impacted the physical properties of the end product foam. Second, they have typically exhibited only limited effectiveness in opening cells.

Another means employed in the art to more easily achieve elevated open cell content in extruded alkenyl aromatic polymer foams is to employ elevated foaming temperatures (typically about 135° C. or more). However, employing elevated foaming temperatures to produce the desired level of open cell content without foam collapse can be disadvantageous because foaming temperature range may be narrow. If there is foam collapse, foam density may be increased, foam cross-section may be reduced, and skin quality may be negatively impacted.

It would be desirable to have a method for making an open cell alkenyl aromatic polymer foam wherein the desired level of open cell content is more easily and consistently maintained without the need for high loadings of conventional dissimilar polymers. It would also be desirable to have a method for making an open cell alkenyl aromatic polymer foam wherein lower foaming temperatures may be employed.

SUMMARY OF THE INVENTION

According to the present invention, there is a method of enhancing open cell formation in making extruded alkenyl aromatic polymer foams of about 30 percent or more open cell content. An alkenyl aromatic polymer material comprising greater than 50 weight percent of alkenyl aromatic monomeric units is heated to form a polymer melt. A nucleating agent may optionally be incorporated into the polymer melt. A blowing agent is incorporated into the polymer melt to form a formable gel. The foamable gel is cooled to a desirable foaming temperature. The formable gel is extruded through a die into a region of reduced pressure to form the foam. A unique aspect of the invention is that an ethylene copolymer having a Vicat softening point of about 85° C. or less is incorporated into the polymer melt at from about 0.1 to about 7 percent based upon the weight of the alkenyl aromatic polymer material. The ethylene copolymer significantly enhances open cell formation at relatively low loadings. A preferred ethylene copolymer is ethylene/vinyl acetate.

According to the present invention, there is an extruded, open cell alkenyl aromatic polymer foam. The foam comprises an alkenyl aromatic polymer material comprising greater than 50 percent by weight of alkenyl aromatic monomeric units. The foam has a density of about 16 to about 250 kg/m$^3$, an average cell size of about 1.2 millimeters or less, and an open cell content of about 30 percent or more. The foam has incorporated therein of an ethylene copolymer having a Vicat softening point of about 85° C. or less at from about 0.1 to about 7 percent an based upon the weight of the alkenyl aromatic polymer material.

DETAILED DESCRIPTION

The present invention provides a method for making an open cell alkenyl aromatic polymer foam of about 30 percent or more open cell content by which the desired level open cell content can be more easily and consistently maintained. Further, a foam product of superior quality is produced. Certain ethylene copolymers are incorporated into the foam during its manufacture.

The particular disclosed ethylene copolymers provide distinct advantages over conventional ethylene polymers disclosed in the prior art as useful in increasing open cell content in extruded alkenyl aromatic polymer foams.

One advantage is that the ethylene copolymers may be employed at significantly reduced loadings and still be effective. Reduced loadings afford material cost savings and an end product foams with reduced loadings of incorporated polymer. Reduced loadings may also reduce impact on physical properties of end product foams.

The ethylene copolymers allow foaming temperatures to be reduced and still achieve the desired level of open cell content as opposed to employing elevated foaming temperatures without the ethylene copolymers. Reduction in foaming temperature affords a broader foaming temperature range, lower density, larger cross-section, and better skin quality. Ethylene copolymers have been found to be particularly effective in manufacturing foams of very high open cell content, such as microcellular foams having about 95 percent or more open cell content useful in vacuum panel applications. Ethylene copolymers have enabled such extruded microcellular foams to be produced at conventional processing conditions with low product foam density, large cross-section, and good skin quality.

Useful ethylene copolymers are those with a Vicat softening point of about 85° C. or less and preferably about 70° C. or less according to ASTM D1525. Preferred ethylene copolymers include those having an ethylene monomeric content of about 50 percent to about 97 percent. The remaining monomeric content may be derived from one or more monomers copolymerizable with ethylene.

Examples of useful ethylene copolymers include ethylene-vinyl acetate copolymer, ethylene-acrylic acid copolymer, ethylene-methacrylic acid copolymer, ethylene-methyl acrylate copolymer, ethylene-ethylacrylate copolymer, ionomers, and ethylene copolymers made with constrained geometry or metallocene catalyst technology.

Useful ionomers include Surlyn® ionomers. Ionomers can be ethylene-methacrylic acid copolymers with zinc, sodium, or lithium cations generated via neutralization. Methacrylic acid content typically is as high as 10 percent.

Ethylene copolymers made with constrained geometry catalyst technology are substantially linear ethylenic polymers having the following physical properties: a melt flow ratio, $I_{10}/I_2$, $\geq 5.63$; a molecular weight distribution, $M_w/M_n$, defined by the equation $M_w/M_n < (I_{10}/I_2) - 4.63$; and a critical shear rate at onset of surface melt fracture of at least 50 percent greater than the critical shear rate at the onset of surface melt fracture of a linear olefin polymer having approximately the same $I_2$ and $M_w/M_n$. Excellent teachings directed to such copolymers are seen in U.S. Pat. No. 5,340,840, which is incorporated by reference herein. Preferred comonomers include $C_{3-10}$ α-olefins such as 1-propane, isobutylene, 1-butene, 1-hexene, 4-methyl-pentene, and 1-octene.

A preferred ethylene copolymer is an ethylene/vinyl acetate copolymer. The ethylene vinyl acetate copolymer has from about 5 percent to about 50 percent and preferably about 10 percent to about 40 vinyl acetate monomeric content based upon the total weight of copolymer.

The ethylene copolymer is incorporated in the present foam at about 0.1 to about 7 percent, preferably about 0.2 to about 5 percent, and most preferably about 0.3 to about 3 percent based upon the weight of the alkenyl aromatic polymer material.

The present foam has the density of from about 16 to about 250 kilograms per cubic meter (kg/m³) and most preferably from about 25 to about 100 kg/m³ according to ASTM D-1622-88.

The present foam has an average cell size of about 1.5 millimeters or less and preferably about 0.001 to about 1.0 millimeters according to ASTM D3576-77.

The present foam has an open cell content of about 30 percent or more, preferably about 50 percent or more, more preferably about 90 percent or more, and most preferably about 95 percent or more according to ASTM D2856-A.

The foam may take any physical configuration known in the art such as sheet or plank. Desirable plank foams include those having a cross-section thickness of about 0.375 inch (0.95 cm) or more.

Extruded alkenyl aromatic polymer foams are generally prepared by heating a thermoplastic material to form a plasticized or melt polymer material, incorporating therein a blowing agent to form a formable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extrudes, mixer, blender, or the like. The blowing agent is mixed with the melt polymer material at an elevated pressure sufficient to prevent substantial expansion of the melt polymer material and to generally disperse the blowing agent homogeneously therein. The ethylene copolymer is incorporated by blending and melting in the polymer melt or dry blending with the polymer material prior to plasticizing or melting. Optionally, a nucleating agent may incorporated by blending in the polymer melt or dry blending with the polymer material prior to plasticizing or melting. The foamable gel is typically cooled to a lower temperature to optimize or attain desired physical characteristics of the foam. The gel may be cooled in the extruded or other mixing device or in separate coolers. The gel is then extruded or conveyed through a die of desired shape to a zone of reduced or lower pressure to form the foam. The zone of lower pressure is at a pressure lower than that in which the formable gel is maintained prior to extrusion through the die. The lower pressure may be superatmospheric or subatmospheric (vacuum), but is preferably at an atmospheric level. The foaming temperature at the die is maintained at a sufficiently high level to ensure open cell formation.

Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 weight percent, preferably about 70 weight percent or more, and preferably greater than 90 weight percent or more alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alpha-methylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent by weight) and most preferably entirely of polystyrene.

Blowing agents useful in making the present foam are those known useful in making extruded open cell alkenyl aromatic polymer foams. Useful agents may include physical and chemical blowing agents. Useful physical blowing agents include inorganic agents and organic blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, e-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), 1,1,2,2-tetrafluoromethane (HFC-134), pentafluoroethane, difluoromethane, perfluoroethane, 2,2-difluoropropane, 1,1,1- trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azadiisobutyronitrile, benzenesulfonhydrazide, 4,4-oxybenzene sulfonyl semicarbazide, p-toluene sulfonyl semi-carbazide, barium azodicarboxylate, N,N'-dimethyl-N, N'-dinitrosoterephthalamide, and trihydrazino triazine.

Teachings to processes for making particular extruded, open cell alkenyl aromatic polymer foams are described below. The ethylene copolymers disclosed herein may be incorporated in those processes to more easily make the open cell foams. The particular open cell foams are disclosed for purposes of description, and are not to be construed as limiting.

Particular useful extruded thermoplastic foams include extruded microcellular alkenyl aromatic polymer foams of high open cell content and processes for making are disclosed in PCT published application WO 96/34038, which is incorporated herein by reference. The disclosed foams have an average cell size of about 70 micrometers or less and preferably about 5 to about 30 micrometers according to ASTM D3576-77. The disclosed foams have an open cell content of about 70 percent or more and preferably about 95 percent or more according to ASTM D2856-A.

In the process disclosed in PCT published application WO 96/34038, useful blowing agents include 1,1-difluoroethane (HFC-152a), 1,1,1-trifluoroethane (HFC-143a), 1,1,1,2-tetrafluoroethane (HFC-134a), chlorodifluoromethane (HCFC-22), carbon dioxide ($CO_2$), and difluoromethane (HFC-32). Preferred blowing agents are HFC-152a, HFC-134a, and carbon dioxide. The above blowing agents will comprise 50 mole percent or more and preferably 70 percent or more of the total number of moles of blowing agent. The balance may be made up of other blowing agents. The amount of blowing agent employed is from about 0.06 to about 0.17 gram-moles per kilogram of polymer, preferably from about 0.08 to about 0.12 gram-moles per kilogram of polymer, and most preferably from 0.09–0.10 gram-moles per kilogram of polymer. The use of a relatively small amount of blowing agent allows formation of a foam with a high open cell content. Preferred foaming temperatures are disclosed as varying from about 118° C. to about 160° C. Most preferred foaming temperatures are disclosed as varying from about 125° C. to about 135° C. In the present invention, it was found that useful foaming temperatures could be reduced to as low as about 113° C. Useful nucleating agents additives include inorganic substances such as calcium carbonate, talc, clay, titanium oxide, silica, barium sulfate, calcium stearate, styrene/maleic anhydride copolymer, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

Another useful extruded alkenyl aromatic foam of larger average cell size and processes for making are seen in WO 96/00258, which is incorporated herein by reference. Open-cell content is about 30 percent or more according to ASTM D2856-87. The disclosed foams have a density of about 1.5 pcf to about 6.0 pcf (about 24 kg/m³ to about 96 kg/m³) and preferably a density of about 1.8 pcf to about 3.5 pcf (about 32 kg/m³ to about 48 kg/m³) according to ASTM D-1622-88. The disclosed foam has an average cell size of from about 0.08 millimeters (mm) to about 1.2 mm and preferably from about 0.10 mm to about 0.9 mm according to ASTM D3576-77.

In the process for making the foam in WO 96/00258, the foaming temperature, which is relatively higher than that for making closed-cell foams (less than 10 percent open-cell according to ASTM D2856-87), is disclosed as varying from about 118° C. to about 145° C. Foaming temperature will vary according to nucleating agent composition and concentration, blowing agent composition and concentration, polymer material characteristics, and extrusion die design. The foaming temperature for the open-cell foam is disclosed as varying from about 3° C. to about 15° C. and preferably about 10° C. to about 15° C. higher than the highest foaming temperature for a corresponding closed-cell foam (less than 10 percent open-cell according to ASTM D2856-87) of substantially equivalent density and cell size made with a substantially equivalent composition (including polymer material, nucleating agent, additives, and blowing agent) in a substantially equivalent process. A preferred foaming temperature is disclosed as being about 33° C. or more higher than the glass transition temperature (according to ASTM D-3418) of the alkenyl aromatic polymer material. A most preferred foaming temperature is disclosed as varying from about 135° C. to about 140° C. In the resent invention, it was found that useful foaming temperatures could be reduced to as low as about 113° C. The amount of blowing agent incorporated into the polymer melt material to make a foam-forming gel is from about 0.2 to about 5.0 gram-moles per kilogram of polymer, preferably from about 0.5 to about 3.0 gram-moles per kilogram of polymer, and most preferably from about 0.7 to 2.0 gram-moles per kilogram of polymer. A nucleating agent such as those described above may be employed.

Various additives may be incorporated in the present foam such as inorganic fillers, pigments, antioxidants, acid scavengers, processing acids, extrusion acids, flame retardants, infrared absorbing and blocking agents, and the like.

Optionally, an infrared attenuating agent such as carbon black, graphite, and titanium dioxide may be incorporated into the foam to reduce thermal conductivity. Suitable carbon blacks include thermal black and furnace black. The agent may be incorporated by dry-blending with polymer resin prior to melting and mixing or may be pre-compounded with the polymer resin to form a concentrate which subsequently can be let down or diluted with additional polymer resin during melting and mixing to achieve the desired concentration of agent. Concentration of the infrared attenuating agent preferably ranges form about 1 to about 10 phr and more preferably from about 2 to about 7 pier. As used herein, "pier"means parts per hundred parts by weight of alkenyl aromatic polymer material.

The present foams are useful in a variety of insulating applications such as in buildings, roofing, and vacuum insulation panels.

EXAMPLES

Examples 1 and 2 and Control Foam 1

Open cell, extruded alkenyl aromatic polymer foams according to the present invention were made employing an ethylene/vinyl acetate copolymer (EVA). A control foam was made with substantially the same foam forming formulation except without the EVA at substantially the same processing conditions except for foaming temperatures. The physical properties of the foams, including open cell content, were determined and compared.

The foams were made on an apparatus comprising an extruded, a mixer, a cooler, and an extrusion die in series. The alkenyl aromatic polymer and the EVA were dry blended and fed to the extruder where they were melted and blended to form a polymer melt. The polymer melt was conveyed to the mixer where a blowing agent was blended therein to form a polymer gel. The gel was conveyed through the die to a region of reduced pressure to form the expanded foam product.

The alkenyl aromatic polymer was a polystyrene of weight average molecular weight of 192,000 according to size exclusion chromatography (SEM). The EVA was ELVAX (trademark of du Pont) 150 having a vinyl acetate monomeric content of approximately 33 percent by weight of the total weight of the copolymer. The polymer feed employed was 97 weight percent polystyrene and 3 weight percent EVA. The control foam was made with 100 percent polystyrene.

The blowing agent mixture was the following: 8.8 parts per hundred parts polymer (phr) C-134a, 2.5 phr ethyl chloride, and 1.1 phr carbon dioxide. Additives employed were the following: 1 phr glycerol monostearate as a cell size enlarger, 0.2 phr tetrasodiumpyrophosphate as an acid scavenger, 0.05 phr barium stearate as an extrusion aid, 0.5 phr linear low density polyethylene as a cell size enlarger, 0.1 phr of a 10 percent concentrate of blue pigment in polystyrene, and 1 phr hexabromocyclododecane as a fire retardant.

The foam of Example 1 with 3 percent by weight of EVA exhibited a 95.2 percent open cell content compared to a 5.0 percent open cell content for the control foam. The foam of Example 2 also with 3 percent by weight of EVA exhibited a 53.4 percent open cell content compared to a 5.0 percent open cell content for the control foam. Due to the presence of the EVA, foaming temperatures could be reduced and cross-sections increased for both foams of the examples compared to that of the control foam. Results are set forth in Table 1.

TABLE 1

Physical Properties for the Foams of Example 1 and Control Example 1

|  | Control Foam | Example 1 | Example 2 |
|---|---|---|---|
| Foaming Temperature (° C.) | 123 | 119 | 113 |
| Density (without skin), pcf (kg/m$^3$) | 2.4 (38) | 2.45 (39.2) | 2.84 (45.5) |
| Thickness, inch (centimeters) | 0.57 (1.4) | 0.71 (1.8) | 0.97 (2.5) |
| Width, inch (centimeters) | 7.63 (19.4) | 9.81 (24.9) | 8.06 (20.5) |
| Vertical Cell Size (millimeters) | 0.07 | <0.1 | 0.07 |
| Open Cell Content (volume percent) | 5.9 | 95.2 | 54.1 |

Examples 3 and 4 and the Control Foams 3–4

Open cell, extruded alkenyl aromatic polymer foams according to the present invention were made employing an ethylene/vinyl acetate copolymer (EVA). Corresponding control foams were made without the EVA at substantially the same processing conditions and with substantially the same foam-forming formulations as the foams of the invention. The physical properties of the foams, including open cell content, were determined and compared.

The alkenyl aromatic polymer was a polystyrene of weight average molecular weight of 132,000 according to SEM. The EVA was the same as employed in Example 1. The polymer feed employed varying contents of EVA with the balance being polystyrene. The control foams were made with 100 percent polystyrene. The blowing agent mixture was the following: 2.8 parts per hundred parts polymer (pier) HFC-134a, 1.8 phr ethyl chloride, and 2.4 phr carbon dioxide.

Graphite was employed as an infrared blocking agent, and calcium stearate was employed as a nucleating agent in some formulations.

The foams were made with the apparatus described in Example 1. After extrusion, the foams were compressed approximately 60 percent and exposed to a vacuum of 0.2 torn R-values for the foams of the examples and the control foams were determined by calculating the reciprocal of the thermal conductivity as measured in BTU-inch/hour-foot$^2$-F°.

It was found that the relatively small EVA loadings in the foams of the examples resulted in significantly increased open cell content compared to the corresponding control foams at the same or substantially the same foaming temperatures resulting in improved R-values. Results are set forth in Table 2.

TABLE 2

Physical Properties for the Foams of Examples 3–4 and Control Foams 3–4

|  | Control Foam 3 | Control Foam 4 | Example 3 | Example 4 |
|---|---|---|---|---|
| EVA (phr) | none | none | 1.0 | 0.5 |
| Graphite (phr) | 3 | 2 | 3 | 2 |
| Calcium Stearate (phr) | none | 0.25 | none | 0.25 |
| Foaming Temperature (° C.) | 131 | 130 | 130 | 130 |
| Fresh Density (skived) lbs./ft$^3$ (kg/m$^3$) | 2.37 (37.9) | 2.36 (37.8) | 2.32 (37.1) | 2.28 (36.5) |
| Open Cell Content (percent) | 76 | 88 | 97 | 97 |
| Density After Compression lbs./ft$^3$ (kg/m$^3$) | 5.93 (94.9) | 5.90 (94.4) | 5.48 (87.7) | 5.97 (95.5) |
| Percent Compression | 60 | 60 | 60 | 61 |
| R-value per inch at 0.2 torr | 18 | 30.4 | 34.5 | 36.7 |

What is claimed is:

1. A method of enhancing open cell formation in making extruded alkenyl aromatic polymer foams of about 50 percent or more open cell content, heating an alkenyl aromatic polymer material comprising greater than 50 weight percent of alkenyl aromatic monomeric units to form a polymer melt, optionally incorporating a nucleating agent into the polymer melt, incorporating a blowing agent into the polymer melt to form a foamable gel, the gel being cooled to a desirable foaming temperature, the foamable gel being extruded through a die into a region of reduced pressure to form the foam, wherein the improvement comprises incorporating into the polymer melt at from about 0.1 to about 7 percent based upon the weight of the alkenyl aromatic polymer material an ethylene copolymer having a Vicat softening point of about 85° C. or less, the ethylene copolymer having an ethylene monomeric content of about 50 percent to about 97 percent based upon the total weight of the ethylene copolymer.

2. The method of claim 1, wherein the ethylene copolymer comprises an ethylene/vinyl acetate copolymer.

3. The method of claim 1, wherein the ethylene copolymer comprises an ethylene/acrylic acid copolymer.

4. The method of claim 1, wherein the ethylene copolymer comprises an ionomer.

5. The method of claim 1, wherein the ethylene copolymer is an ethylene copolymer made with constrained geometry or metallocene catalyst technology.

6. The method of claim 1, wherein the ethylene polymer comprises and ethylene/methacrylic acid copolymer.

7. The method of claim 1, wherein the ethylene copolymer comprises an ethylene/methylacrylate copolymer.

8. The method of claim 1, wherein the ethylene polymer comprises an ethylene/ethyl-acrylate copolymer.

9. The method of claim 1, wherein the foam has an open cell content of about 90 percent or more.

10. The method of claim 1, wherein the foam has an open cell content of about 95 percent or more.

11. The method of claim 1, wherein the ethylene copolymer is incorporated at from about 0.2 to about 5 percent based upon the weight of the alkenyl aromatic polymer material.

12. The method of claim 1, wherein the ethylene copolymer is incorporated at from about 0.3 to about 3 percent based upon the weight of the alkenyl aromatic polymer material.

13. The method of claim 1, wherein the ethylene copolymer has a Vicat softening point of about 70° C. or less.

14. The method of claim 1, wherein a nucleating agent is incorporated at from about 0.01 to about 5 parts by weight per hundred parts alkenyl aromatic polymer, the blowing agent being selected from the group consisting of 1,1-difluoroethane (HFC-152a), 1,1,1-trifluoroethane (HFC-143a), 1,1,1,2-tetrafluoroethane (HFC-134a), chlorodifluoromethane (HCFC-22), carbon dioxide ($CO_2$), and difluoromethane (HFC-32) and comprising 50 mole percent or more of the total number of moles of blowing agent, the blowing agent being incorporated at from 0.06 to about 0.17 gram-moles per kilogram of polymer.

15. The method of claim 1, wherein the amount of blowing agent incorporated is from about 0.2 to about 5.0 gram-moles per kilogram of alkenyl aromatic polymer, the foaming temperature being at from about 3° C. to about 15° C. higher than the highest foaming temperature for a corresponding closed-cell foam of substantially equivalent density and cell size made with a substantially equivalent composition in a substantially equivalent process, the foaming temperature being at from about 113° C. to about 145° C.

16. An extruded, open cell alkenyl aromatic polymer foam, the foam comprising: an alkenyl aromatic polymer material comprising greater than 50 percent by weight of alkenyl aromatic monomeric units, the foam having a density of about 16 to about 250 kg/m³, the foam having an average cell size of about 1.2 millimeters or less, the foam having an open cell content of about 50 percent or more, the foam having about 0.1 to about 7 percent of an ethylene copolymer an based upon the weight of the alkenyl aromatic polymer material, the ethylene copolymer having a softening point of about 85° C. or less, the ethylene copolymer having an ethylene monomeric content of about 50 percent to about 97 percent based upon the total weight of the ethylene copolymer.

* * * * *